United States Patent
Coffman

(10) Patent No.: US 6,779,552 B1
(45) Date of Patent: Aug. 24, 2004

(54) DOMESTIC HOT WATER DISTRIBUTION AND RESOURCE CONSERVATION SYSTEM

(75) Inventor: Frederick E. Coffman, 196 Anco Dr., Kingsport, TN (US) 37664

(73) Assignee: Frederick E. Coffman, Kingsport, TN (US)

( * ) Notice: Subject to any disclaimer, the term of this patent is extended or adjusted under 35 U.S.C. 154(b) by 0 days.

(21) Appl. No.: 10/146,640

(22) Filed: May 14, 2002

(51) Int. Cl.[7] .................... F16K 49/00; E03B 7/07
(52) U.S. Cl. ................ 137/337; 137/357; 137/563; 251/82
(58) Field of Search ................ 251/82; 137/337, 137/357, 563

(56) References Cited

U.S. PATENT DOCUMENTS

| | | | | |
|---|---|---|---|---|
| 284,770 A | * | 9/1883 | Snow ........................... | 251/82 |
| 913,491 A | * | 2/1909 | Greenlee ..................... | 251/82 |
| 1,369,444 A | * | 2/1921 | Koplin ......................... | 251/82 |
| 3,929,153 A | | 12/1975 | Hasty .......................... | 137/337 |
| 5,331,996 A | | 7/1994 | Ziehm ......................... | 137/337 |
| 5,511,579 A | | 4/1996 | Price ............................ | 137/337 |
| 5,518,022 A | | 5/1996 | Ziehm ......................... | 137/337 |
| 5,620,021 A | | 4/1997 | Hugo ........................... | 137/337 |
| 5,622,203 A | | 4/1997 | Givler et al. ................ | 137/337 |
| 5,819,785 A | | 10/1998 | Bardini ........................ | 137/337 |
| 5,918,625 A | * | 7/1999 | Ziehm ......................... | 137/357 |

* cited by examiner

*Primary Examiner*—A. Michael Chambers
(74) *Attorney, Agent, or Firm*—Pitts & Brittian, P.C.

(57) ABSTRACT

A domestic water distribution system that continuously delivers heated water to one or more hot water faucets. The system utilizes a convective return loop from the desired faucets, which is regulated by a flow control device. The control device is specifically designed to allow unhindered flow during circulation without allowing reverse flow when a faucet is opened. The flow control device has an easily accessible handwheel adjustment that is used to select the three modes of operation and the flow rate. These modes are called: HELD-ON, HELD-OFF, and NORMAL-OPERATION. With the first two modes being used to fill and flush the system as is necessary with new installation and recreation vehicles. Also, a lighter-than-water checking element is used, which allows the system to function in single-level plumbing installations without the need for inclined supply and return routing. The circulation is further assured by having the plumbing return and cold water supply connected to the base of the water heater, which creates a flushing action of sediment that accumulates inside and since plumbing insulation is not restricted, heat loss is limited.

10 Claims, 4 Drawing Sheets

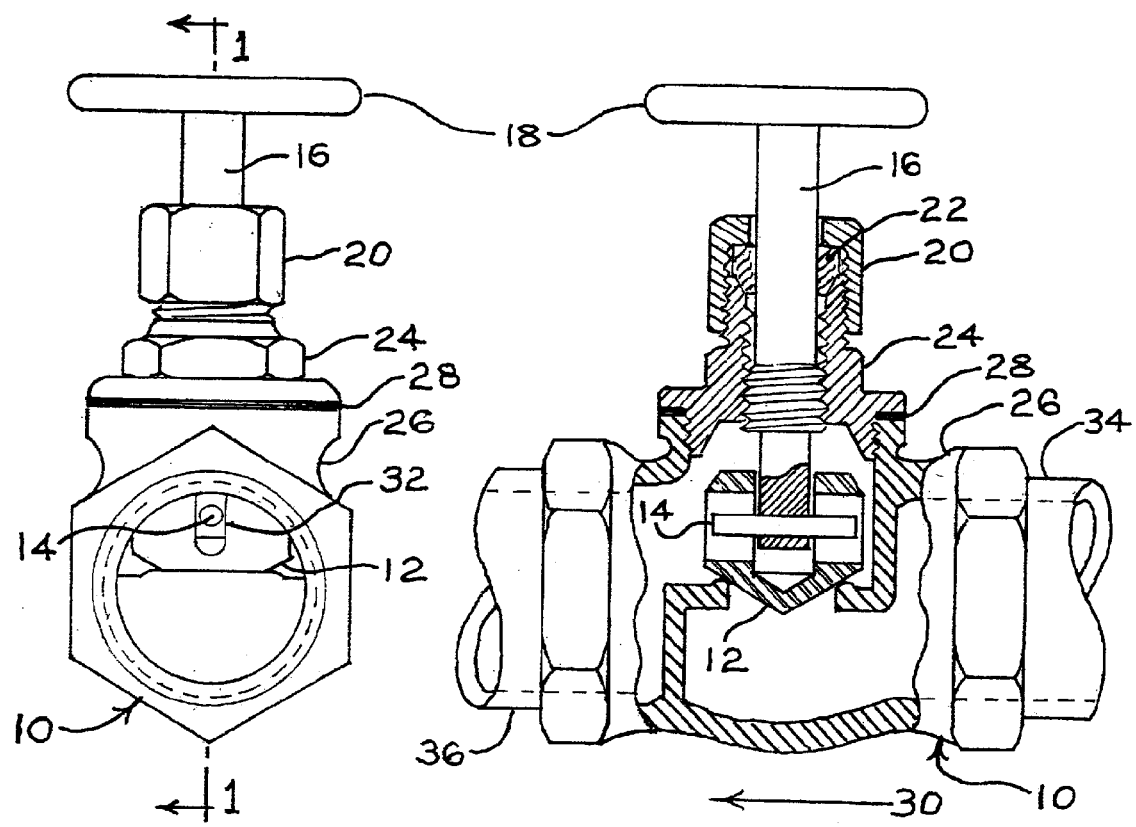
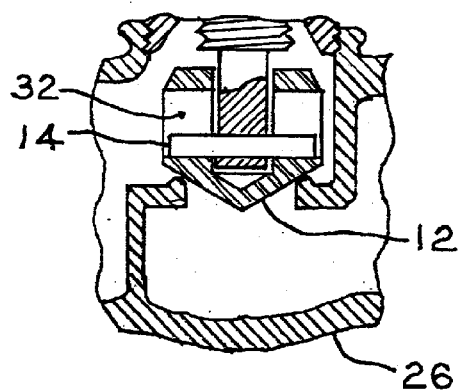
Fig. 2
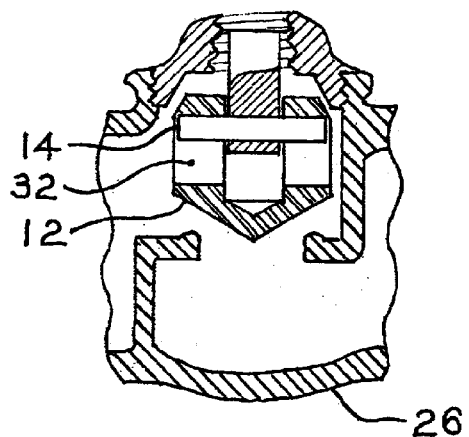
Fig. 3
Fig. 1

DOMESTIC HOT WATER DISTRIBUTION AND RESOURCE CONSERVATION SYSTEM

FEDERALLY SPONSORED RESEARCH

Not Applicable

SEQUENCE LISTING OR PROGRAM

Not Applicable

BACKGROUND

1. Field of Invention

This invention relates to thermal convection of heated water for domestic use, specifically to an improved and simplified controlling valve.

2. Discussion of Prior Art

The inconvenience and wastefulness of waiting for hot water to arrive at the faucet is an expense and bother. Various systems and devices have been developed to address this problem, but have had limited success.

Systems that employ pumps such as U.S. Pat. No. 5,277,219 to Lund—Jan. 11, 1994; U.S. Pat. No. 5,323,803 to Blumenauer Jun. 28, 1994; U.S. Pat. No. 5,511,579 to Price Apr. 30, 1996, all require an electrical source, timers, and temperature sensors, that add considerably to the cost and complexity of operation. Similar systems also waste energy by returning some heated water into the cold water plumbing.

Aspirator assisted systems such as U.S. Pat. No. 5,331,996 to Ziehm Jul. 26, 1994; U.S. Pat. No. 5,518,022 to Ziehm May 21, 1996; U.S. Pat. No. 5,622,203 to Givler et al. Apr. 22, 1997, all introduce a flow restriction into the cold water system. Also, when hot and cold water faucets are open at the same time, a portion of warmed water is introduced into the cold water system. This type of system does not work well in a one-story dwelling where the plumbing and the water heater are at the same level. Some systems recommend not insulating the return plumbing, creating an energy loss.

Basic convective flow systems, such as U.S. Pat. No. 3,929,153 to Hastey Dec. 30, 1975 and U.S. Pat. No. 5,620,021 to Hugo Apr. 15, 1997, have restrictive installation requirements. These and other past art heretofore known suffer from a number of disadvantages:

(a) The need to have upwardly sloped supply and downwardly sloped return plumbing with no sections inversely oriented.

(b) The need to have venting devices at the highest point in the system.

(c) The need to have some kind of connection between the hot and cold water systems, such as, check valves, thermostatic valves, aspirator devices, heat exchangers, and motor driven pumps.

(d) The need to have the water heater at the lowest point, preferably 5 feet or more below the faucets being served.

(e) The need to have a check valve element that is heavier than the liquid involved so as to favor a closed condition.

(f) The need to have the check valve means located at or near the water heater.

(g) Some have the need to not insulate the return portion of the convective loop.

OBJECTS AND ADVANTAGES

Accordingly, several objects and advantages of my invention are:

(a) To provide a system that is not sensitive to variations in plumbing orientation, such as downward sloping portions of the supply and upward sloping portions of the return plumbing.

(b) To provide a system that does not need air venting devices.

(c) To provide a system with no connections needed between the hot and cold water plumbing.

(d) To provide a system that can have the water heater on the same level as the faucets being served.

(e) To provide a system with a lighter-than-water check valve element, so as to remain open during convective flow periods. This element to be approximately 0.95 specific gravity, so that reverse flow dynamics induces closure during hot water flow at any hot water faucet.

(f) To provide a system that can have the controlling check valve located at various places within the return loop from the hot water faucet.

(g) To provide a system that can have any amount of insulation used on both the supply and return plumbing loops.

Further objects and advantages are to provide a system that can be easily used and serviced by an average homeowner. Specifically suitable for use in a recreational vehicle (RV) where periodic servicing such as winterizing, flushing, cleaning, and filling is a necessary operation. Still further objects and advantages will become apparent from a consideration of the ensuing description and drawings.

SUMMARY

This invention is a simplified hot water circulation system with a multifunctional flow control device that specifically addresses single level systems such as those found in recreation vehicles. The flow control device employs a movable element that is lighter-than-water which allows unimpeded flow; the flow is induced by the differential density within the water heater. This system is also readily adaptable to single level dwellings without a basement as well as multilevel dwellings.

DRAWINGS

Drawing Figure

FIG. 1 shows a partial sectional view of the valve in a normal operating position and an end view indicating the section location.

FIG. 2 shows a section fragment of the valve in the closed position.

FIG. 3 shows a section fragment of the valve in the defeated or held-open position.

REFERENCE NUMERALS IN DRAWINGS

Figure 4:
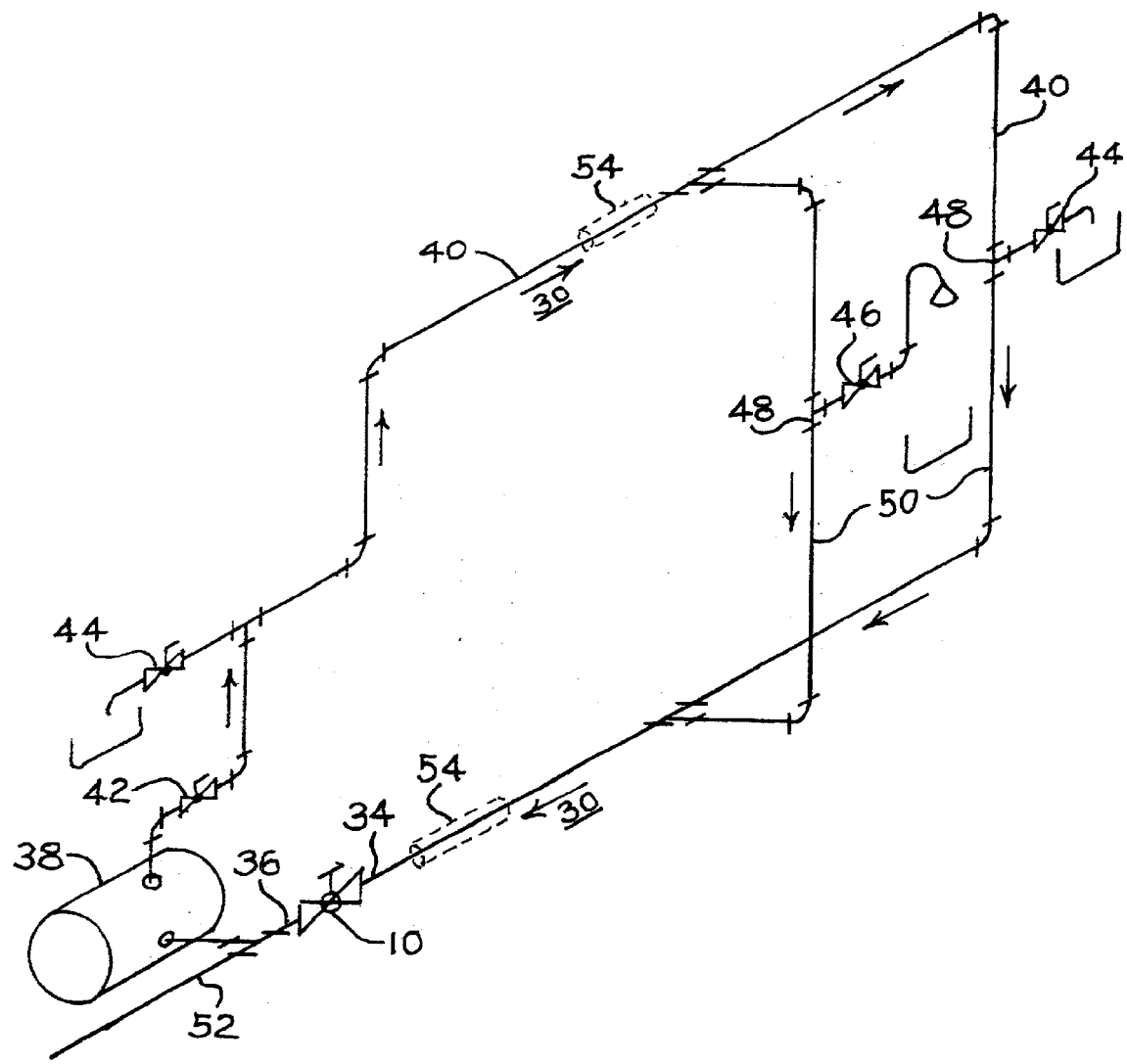
FIG. 4 shows a diagrammatic illustration of a hot water system in a recreation vehicle (RV).

10 valve assembly
12 checking element 14 restrainer pin
16 valve stem
18 handwheel
20 packing nut
22 packing
24 bonnet
26 valve body
28 gasket
30 flow arrow
32 slot
34 inlet
36 outlet
38 RV-type water heater
40 hot water pipe
42 shutoff valve
44 sink faucet
46 shower faucet
48 tee
50 return water pipe
52 cold water supply pipe
54 insulation
56 home-type water heater
58 drain valve

DETAILED DESCRIPTION

Description—FIGS. 1, 2,3, and 4 Preferred Embodiment

A preferred embodiment of the present invention is illustrated in FIG. 1 (sectional view) and an end view indicating the section location. Valve assembly 10 is a familiar globe-type valve with modified and additional parts that serve a multipurpose function. Said valve showing inlet 34, outlet 36, and flow arrow 30 to have a normal fluid flow direction (right to left). Typical valves of this type have a handwheel 18, valve stem 16, packing nut 20, and packing 22 which do a sealing function between the external moving parts. The threaded engagement of bonnet 24 into valve body 26 completes the assembly of nonmoving parts.

FIG. 1 (sectional view) is illustrated in a normal operating position, with valve stem 16 and restrainer pin 14 assembly such that pin 14 is in the center of slot 32. Checking element 12, which is in an off position, is shown resting on the seat portion of valve body 26. Checking element 12 is free to move vertically until restrainer pin 14 contacts the bottom of slot 32. Since checking element 12 is made from a lighter-than-water material, element 12 will float to an ON position when valve assembly 10 is filled with water.

FIG. 2 Illustrates stem 16 and pin 14 assembly in the lowest position, which is the HELD-OFF condition.

FIG. 3 Illustrates stem 16 and pin 14 assembly in the highest position, which is the HELD-ON condition. These conditions are explained in more detail in the operation section.

FIG. 4 Illustrates a diagramatic plumbing system typically found in a recreation vehicle. RV-type water heater 38 is a small under-counter design that has a capacity of 6 to 10 gallons. Hot water flow, as indicated by flow arrows 30, goes first through shutoff valve 42 and then on through tees in hot water pipe 40 to tee 48. Thereby supplying sink faucet 44 and shower faucet 46 with heated water. This convective flow continues on through tees 48 into return water pipes 50, arriving at inlet 34 of valve assembly 10. The outlet 36 of valve 10 is connected to a tee along with the cold water supply pipe 52 which is in turn connected to the inlet of water heater 38. Also note that both hot water pipe 40 and return water pipe 50 are continuously covered by insulation 54.

Figure 5:
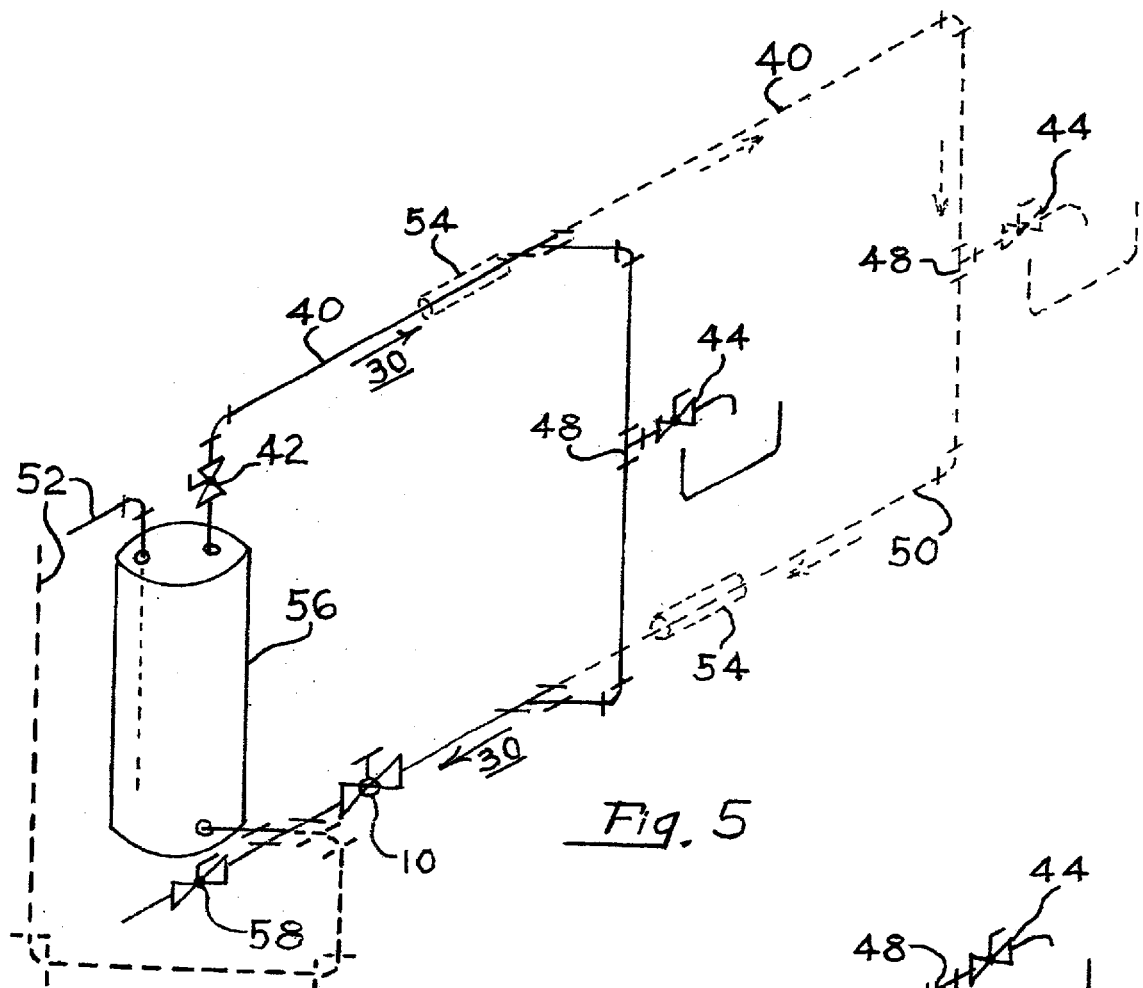
FIG. 5 shows a diagrammatic illustration of a hot water system in a single story dwelling with overhead plumbing.
Figure 6:
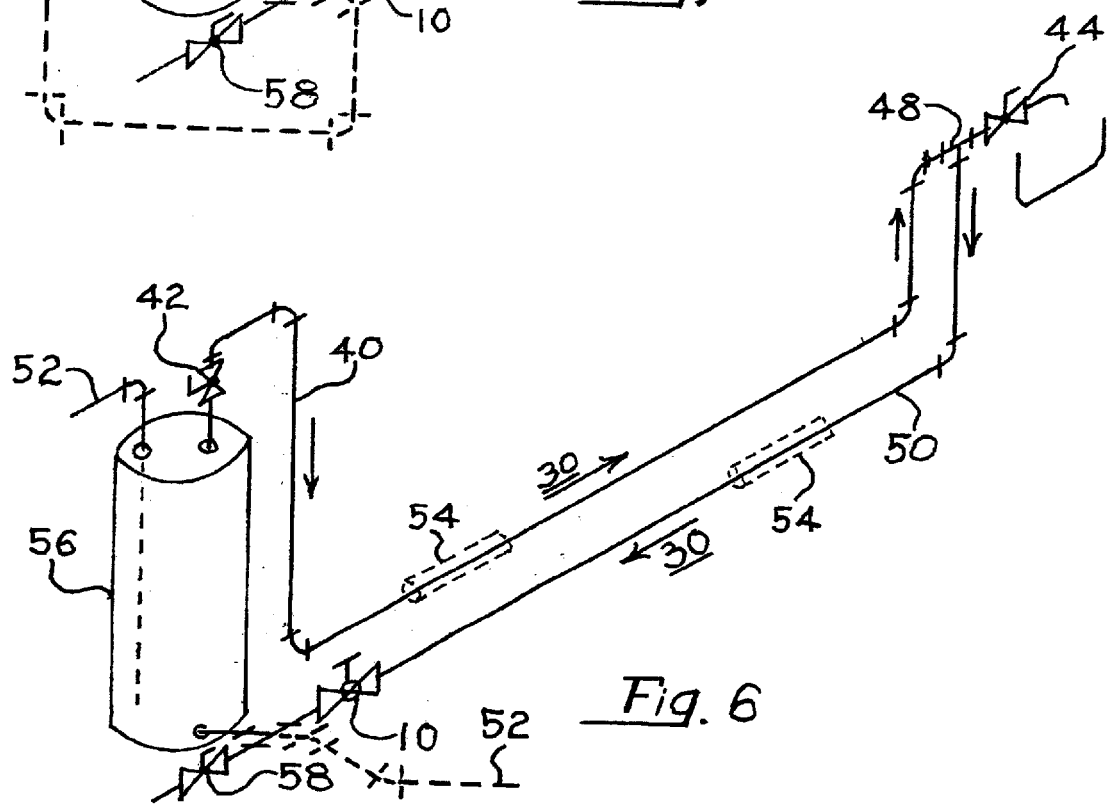
FIG. 6 shows a diagrammatic illustration of a hot water system in a single story dwelling with below floor plumbing.
Figure 7:
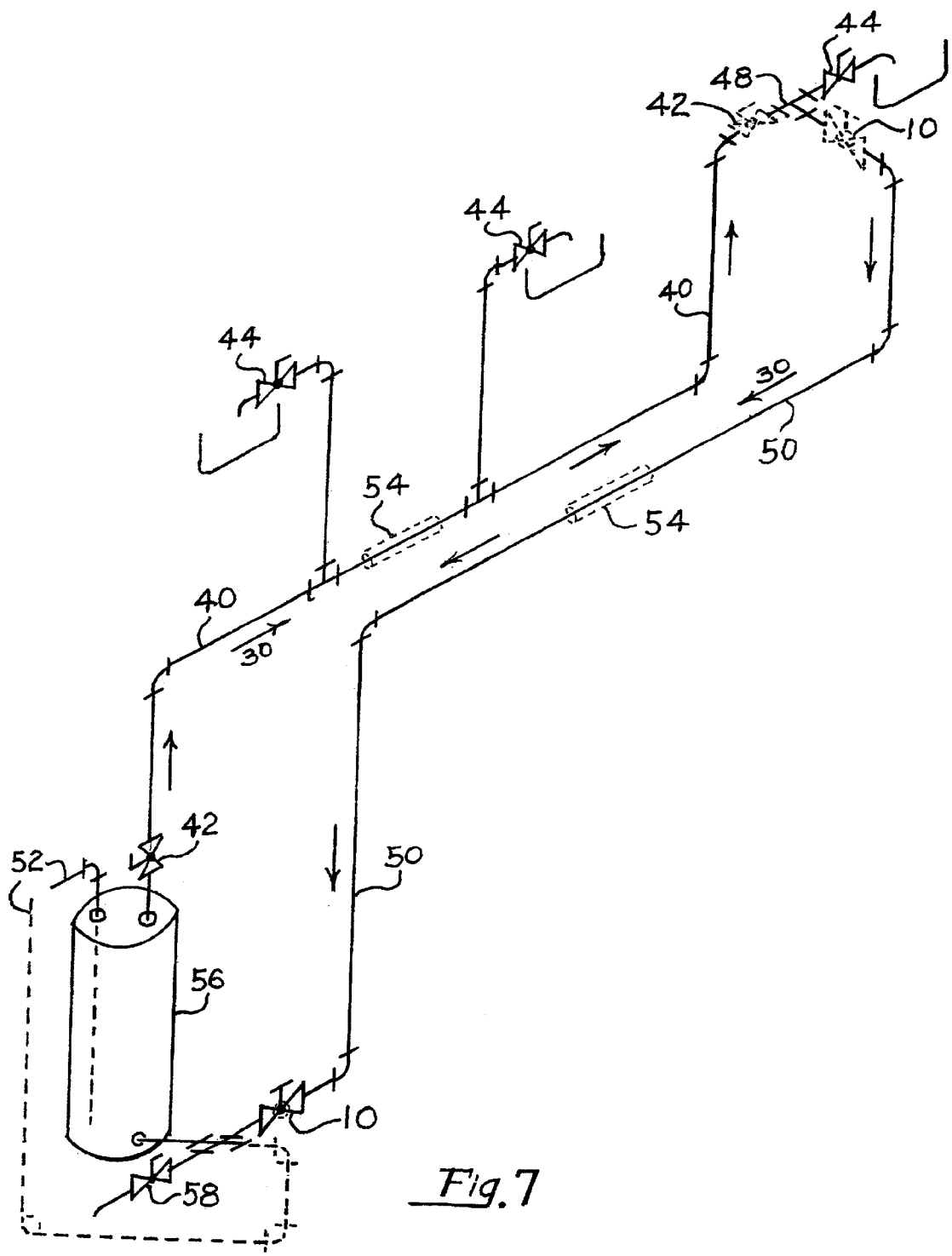
FIG. 7 shows a diagrammatic illustration of a hot water system in a two story dwelling, showing options for control valve locations.

FIGS. 5, 6, 7 Additional Embodiments

Additional embodiments illustrated in FIG. 5 and FIG. 6 are similar in many ways to FIG. 4. With FIGS. 5 and 6 illustrating the use of a home-type water heater 56. Cold water supply pipe 52, which can be routed into said water heater either into the top, as indicated by solid-line plumbing, or into the bottom, as indicated by a dashed-line.

FIG. 5 Illustrates hot water pipe 40 above the supplied sink faucets 44, which employs the same circulation principals shown in FIG. 4.

FIG. 6 In contrast, shows hot water pipe 40 routed down to the same level as the return pipe 50. This arrangement can be found in pre-manufactured homes and homes without a basement. Similarly, the cold water pipe 52 can be routed to either the top or the bottom of water heater 56 (as shown in FIG. 5).

FIG. 7 Illustrates a diagramatic plumbing system typically found in a single level home where the home-type water heater 56 is in a basement area. The convective flow, as indicated by arrows 30, employs the same principal as previous figures. Similarly, the cold water supply pipe 52 can be routed to either the top or the bottom of water heater 56 (as seen in both FIGS. 5 and 6). The advantage of connecting to the bottom of heater 56 will be explained in the ensuing operation section. An important feature difference in FIG. 7 is the optional location of valve assembly 10 and valve 42. The conventional location of valve 10 is at the base of heater 56 as illustrated with solid lines. The preferred optional location is next to tee 48, as indicated by dashed outline of valve 10. An additional preferred location of valve 42, is also next to tee 48, as indicated by dashed outline of valve 42. The drain valve 58 is moved so as to conform to the arrangement shown in FIGS. 5,6, and 7.

Advantages

From the description above, a number of advantages become evident:

(a) Saving of time waiting for hot water to arrive at a faucet.

(b) Saving of energy used to reheat cooled water in a conventional water system.

(c) Saving potable water resource as well as less water lost into the sewer system.

(d) All of the above savings become much more crucial when such a system is used in a recreational vehicle, while operating in a self-contained condition. Not only is the tank for heat energy of limited size, the fresh water and the waste water also have a limited capacity. Water used from the fresh water tank must be collected and held onboard the RV.

(e) Valve 10, tee 48, and valve 42 (as shown in FIG. 7) could be a single unit device for ease of installation and operation.

Operation—FIGS. 1, 2, 3, and 4 Preferred Embodiment

To begin describing the main mode of operation, first consider having an installation such as shown in FIG. 4. The water heater 38 is at floor level with the plumbing 40 routed vertically, supplying the first faucet 44, then proceeding overhead before dropping down to tees 48 that supply faucets 44 and 46. The above said plumbing would constitute a normal distribution system. Additional plumbing leaving tees 48, proceeds back down to floor level through plumbing 50 and then to inlet 34 of valve 10. The outlet 36 of valve 10 and cold water supply pipe 52 are then jointly routed to the input of water heater 38. Said arrangement forms a convective loop that circulates due to the pressure produced by density differences within the water heater and the plumbing arrangement. These pressures developed within a single floor, as in FIG. 4, are very small, thus a convective loop that is unhindered by any mechanical device is essential.

FIG. 1 Shows valve 10, previously described as a globe type valve, with the internal parts in a normal operating mode. The three basic modes of operation are as follows:

(a) HELD-ON Handwheel 18 fully counterclockwise as shown in FIG. 3.
(b) HELD-OFF Handwheel 18 fully clockwise as shown in FIG. 2.
(c) NORMAL OPERATION Handwheel 18 approx. one turn counterclockwise from the HELD-OFF position.

These three modes are utilized as follows during filling, flushing, and normal operation.

In filling the system (as shown in FIG. 4), the following steps should be taken:

1. Turn valve 10 to the HELD-OFF position.
2. Turn other valves off and apply water pressure to pipe 52.
3. As water heater 38 fills, open valve 42, and valves 44 and valve 46 so as to allow trapped air to be released. (Supply loop 40 should now be filled to all faucets.)
4. Now turn valve 42 off and valve 10 to the HELD-ON position, allowing pipe 50 to fill as valves 44 and 46 are opened to release trapped air.
5. Return valve 10 to the NORMAL-OPERATION position, (approx. one turn open) and open valve 42.

The plumbing system is now filled with water without the use of venting devices. Water heater 38 can now be activated electrically or by gas flame. When the water heater reaches its set temperature, convective flow will supply instant hot water at faucets 44 and 46. Well known with this and other prior art, a check valve must be in the system to prevent simultaneous flow from the top and bottom of water heater 38 when any faucet is opened. If not addressed, a mixture of hot and cold water would arrive at the faucet due to reverse flow in water pipe 50.

Referring to FIG. 1, valve 10 is shown in a normal operating position, with checking element 12 resting in a seated position as would be the case without water being present. Since element 12 is free to rise vertically until contacting pin 14, which would in turn allow unhindered flow as indicated by arrow 30. When any faucet is opened, reverse flow between element 12 and the seat portion of valve body 26 will be initiated. This flow, due to the Bernoullie-effect, forms a reduced pressure at this opening which in turn draws element 12 onto a seated position. This action causes the flow in pipe 50 to stop. As long as a faucet remains open, the pressure at outlet 36 (back side of element 12) will be greater than inlet 34 (under side of said element) which causes valve 10 to stay off until said faucet is turned off. At this time, under no-flow conditions, the pressure will become equalized on either side of valve 10, which will allow checking element 12 to float free and return to normal convective flow.

A further understanding of fluid dynamics involved with the above explanation would require an understanding that is beyond the scope of this operation section.

It should be added that valve 10 can also adjust the effective circulation rate from nearly off, to a maximum which is just before pin 14 contacts the top of slot 32. Any additional counterclockwise rotation would cause said valve to be in the HELD-ON position.

Operation—FIGS. 5 and 6 Additional Embodiment

FIGS. 5 and 6 Illustrate very similar hot water systems compared to FIG. 4, except water heater 56, which is a home-type water heater. The circulation principals are the same as the above operation section but, with the following additions or differences:

(a) Cold water supply pipe 52 (dashed line) shows the preferred location into a cross connector at the base of heater 56.
(b) Water heaters 56 are on the same floor as the faucets being supplied.
(c) FIG. 6 shows the plumbing 40 and 50 routed at or below floor level.

Note: This configuration has the least level of circulation pressures, which led to the specific design of checking element 12, which addressed this problem.

FIG. 7 Illustrates an additional similar system but water heater 56 is located in the basement below the living area. Circulation principals are the same but, with the following additions or differences:

(a) Cold water supply pipe 52 (dashed line) shows the preferred location into a cross-type connector at the base of heater 56. Note: The main advantage of this location is to clear sediment away from inside the heater. This assures unhindered circulation loop as previously discussed above.
(b) Valve 10 has a preferred location next to tee 48 (as shown by dashed outline). This location should always be next to the most remote faucet in the system. This location would likely be in an easily accessible cabinet that would make changing the mode of operation very convenient. Such as turning valve 10 off while away for extended periods which would conserve energy-loss through the insulation 54.

Conclusion, Ramifications, and Scope

Accordingly, the reader can easily understand that having a system as previously described, would save time, money, and natural resources. The costs of adding the necessary items to a new home or to an existing home can be recovered within a few years. Additionally, having such a system in a recreation vehicle would enable the user to conserve water that is limited by tank capacities.

While my above description contains many specificities, these should not be construed as limitations on the scope of the invention, but rather as an exemplification of one preferred embodiment thereof. Several other variations are possible, for example:

The circulation loops can simultaneously supply faucets on two separate floors as found in two story buildings;

Solar heating could be added to the supply plumbing 40 which would offset heat losses;

A ball-type version of valve 10 with a side push rod to tilt the ball away from its seat, thus creating a HELD-ON mode of operation;

A solenoid valve in conjunction with a timer could be used to stop the circulation during periods of nonuse;

The system could easily be adapted for use in a houseboat or a floating home;

I claim:

1. A hot water distribution system for a single level comprising:
   a water heater;
   at least one faucet;
   a first conduit providing flow communication from said water heater to said faucet;
   a second conduit providing flow communication from said first conduit to said water heater; and
   a valve body located within said second conduit, said valve body comprising an inlet, an outlet, a generally horizontal valve seat defined within said valve body between said inlet and said outlet and a check element mounted for vertical movement within said valve body above said valve seat, said check element having a specific gravity less than 1.

2. A system in accordance with claim 1, wherein the specific gravity of said check element is less than about 0.97.

3. A system in accordance with claim 1, wherein said specific gravity of said check element is about 0.95.

4. A system in accordance with claim 1 wherein said check element is movable to a fully opened position relative to said valve seat.

5. A system in accordance with claim 1, wherein said check element is movable to a fully closed position relative to said valve seat.

6. A valve for a hot water distribution system, said valve comprising a valve body, having an inlet, an outlet, a generally horizontal valve seat defined within said valve body between said inlet and said outlet and a check element mounted for vertical movement within said valve body above said valve seat, said check element having a specific gravity less than 1.

7. A valve in accordance with claim 6, wherein the specific gravity of said check element is less than about 0.97.

8. A valve in accordance with claim 6, wherein said specific gravity of said check element is about 0.95.

9. A valve in accordance with claim 6 wherein said check element is movable to a fully opened position relative to said valve seat.

10. A valve in accordance with claim 6, wherein said check element is movable to a fully closed position relative to said valve seat.

* * * * *